(12) United States Patent
Westre et al.

(10) Patent No.: US 7,182,291 B2
(45) Date of Patent: Feb. 27, 2007

(54) INTEGRATED AIRCRAFT STRUCTURAL FLOOR

(75) Inventors: Williard N. Westre, Bellevue, WA (US); David W. Evans, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/086,307

(22) Filed: Mar. 23, 2005

(65) Prior Publication Data

US 2006/0214058 A1 Sep. 28, 2006

(51) Int. Cl.
*B64C 1/18* (2006.01)
(52) U.S. Cl. .................... 244/119; 244/131
(58) Field of Classification Search ............ 244/117 R, 244/119, 123.13, 123.6; 428/116
See application file for complete search history.

(56) References Cited

U.S. PATENT DOCUMENTS

| | | | | |
|---|---|---|---|---|
| 2,607,447 A | * | 8/1952 | Tuttle | 52/787.12 |
| 3,155,348 A | * | 11/1964 | Ricard | 244/119 |
| 3,771,748 A | * | 11/1973 | Jones | 244/123.13 |
| 3,938,764 A | | 2/1976 | McIntyre et al. | 244/117 |
| 4,399,642 A | * | 8/1983 | Bard et al. | 52/483.1 |
| 4,479,621 A | | 10/1984 | Bergholz | 244/117 |
| 4,557,961 A | * | 12/1985 | Gorges | 428/117 |
| 4,577,450 A | * | 3/1986 | Large | 428/116 |
| 4,593,870 A | | 6/1986 | Cronkhite et al. | |
| 5,083,727 A | | 1/1992 | Pompei et al. | 244/118 |
| 5,106,668 A | | 4/1992 | Turner et al. | |
| 5,460,865 A | * | 10/1995 | Tsotsis | 428/116 |
| 5,685,229 A | * | 11/1997 | Ohara et al. | 105/397 |
| 5,806,797 A | | 9/1998 | Micale | |
| 5,928,754 A | | 7/1999 | Kondo et al. | 428/95 |
| 5,992,112 A | * | 11/1999 | Josey | 52/309.8 |
| 6,039,288 A | | 3/2000 | Huber et al. | 244/118 |
| 6,117,520 A | * | 9/2000 | Wielinga et al. | 428/116 |
| 6,427,945 B1 | | 8/2002 | Bansemir | 244/129 |

FOREIGN PATENT DOCUMENTS

| | | |
|---|---|---|
| EP | 0 644 096 A1 | 3/1995 |
| EP | 0 783 960 A2 | 7/1997 |
| EP | 1 197 669 A1 | 4/2002 |
| FR | 2 686 0431 A1 | 7/1993 |
| WO | WO 99/42350 A1 | 8/1999 |

\* cited by examiner

*Primary Examiner*—Galen Barefoot
(74) *Attorney, Agent, or Firm*—Baker & Hostetler LLP

(57) ABSTRACT

A number of integrated floor structures made of lightweight composite materials for use in an aircraft are disclosed. Generally, each of such floors includes a top-layer skin, a bottom-layer skin disposed below the top-layer skin and a first structural core disposed between the top-layer skin and the bottom-layer skin, the first structural core being composed of a honeycomb composite material. One or more denser structural cores can also be incorporated at strategic locations.

27 Claims, 9 Drawing Sheets

INTEGRATED AIRCRAFT STRUCTURAL FLOOR

FIELD OF THE INVENTION

This invention relates to novel structures and devices for lightweight aircraft floors.

BACKGROUND OF THE INVENTION

Originally, naturally available and relatively light materials, such as wood, were the most common materials used for constructing aircraft. However, with the development of new alloys the aircraft construction industry shifted from one of carpentry to one of metal shaping.

Relatively recently, a new generation of materials known as "composites" or "composite materials" were developed. Certain composite materials often provide an excellent strength-to-weight ratio as compared to metals, and their acceptance into the various aircraft industries is near universal.

Generally, there are two major genres of composite materials: honeycomb structures and laminates. Honeycomb structures are exceeding light materials that provide unequalled structural support (for their weight) when placed in wings and other strategic locations in a given aircraft. Laminate materials are generally typically stronger than honeycomb structures, and while usually not as light as honeycomb structures are often lighter than any viable metal equivalent.

As the airline industry becomes increasingly more competitive, new applications of materials are sought to lighten aircraft without compromising essential structural integrity. Accordingly, new uses for composites may be desirable.

SUMMARY OF THE INVENTION

In one aspect, an integrated floor made of lightweight composite materials for use in an aircraft includes a top-layer skin, a bottom-layer skin, and a first structural core disposed between the top-layer skin and bottom-layer skin, the first structural core being composed of a honeycomb composite material.

In another aspect, an integrated floor for use in an aircraft includes a top-layer skin, a high density honeycomb core secured to the top-layer skin, and a low-density honeycomb core secured to the high-density honeycomb core.

In still another aspect, an integrated floor for use in an aircraft includes a top-layer skin, a first structural means secured to the top-layer skin for providing structural support; and an attachment means secured to the top-layer skin for attaching seats to the integrated floor.

There has thus been outlined, rather broadly, certain embodiments of the invention in order that the detailed description thereof herein may be better understood, and in order that the present contribution to the art may be better appreciated. There are, of course, additional embodiments of the invention that will be described or referred to below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The disclosed composite floors represent a variety of inventive innovations created to provide modern aircraft with rugged, yet exceedingly light structural components.

Figure 1:
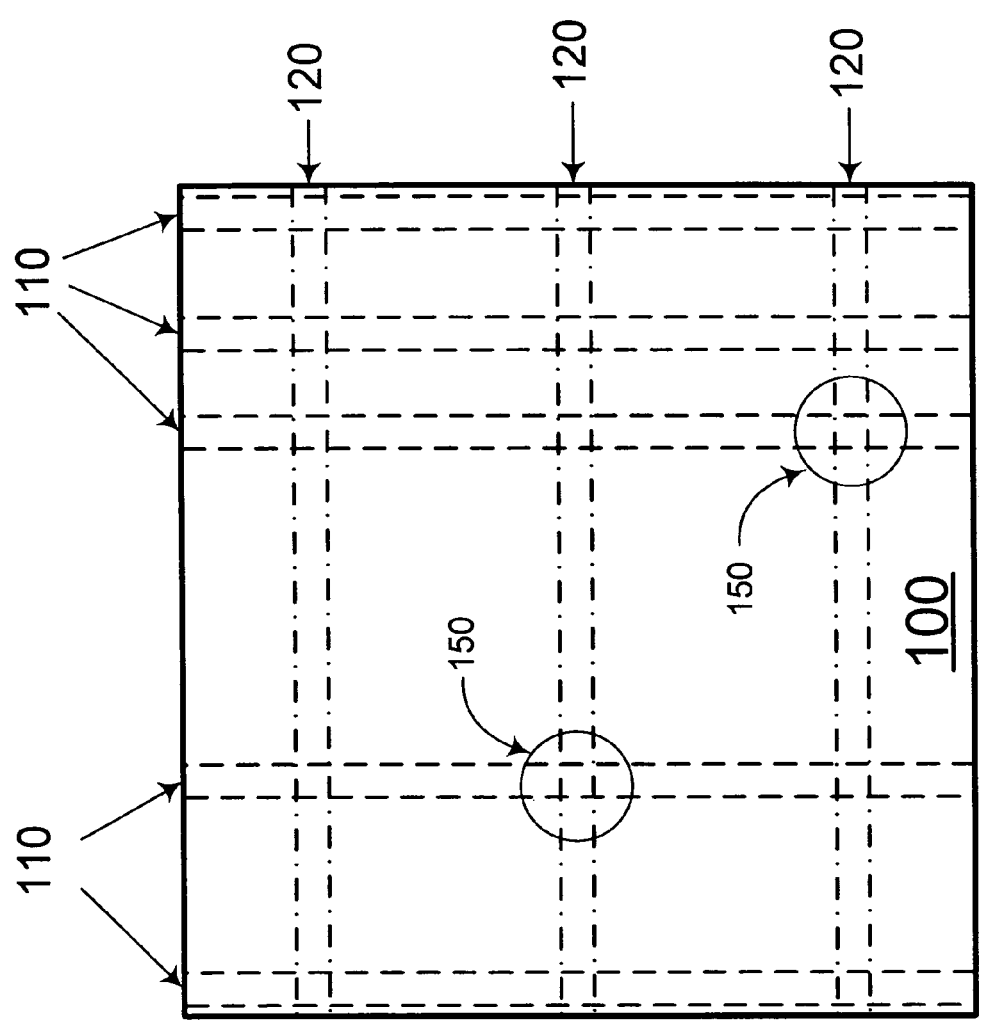
FIG. 1 is a top view of a composite floor.

FIG. 1 is a top view of a portion of an exemplary composite floor 100. As shown in FIG. 1, the composite floor portion 100 includes a number of seating tracks 110 running along the length of the composite floor portion 100 as well as a number of floor beam paths 120 running along the width of the composite floor portion 100. As further shown in FIG. 1, the seating tracks 110 and beam paths 120 generally run perpendicular to each other, and a number of intersection nodes 150 are found wherever a particular seating track 110 crosses a particular beam path 120.

Figure 2:
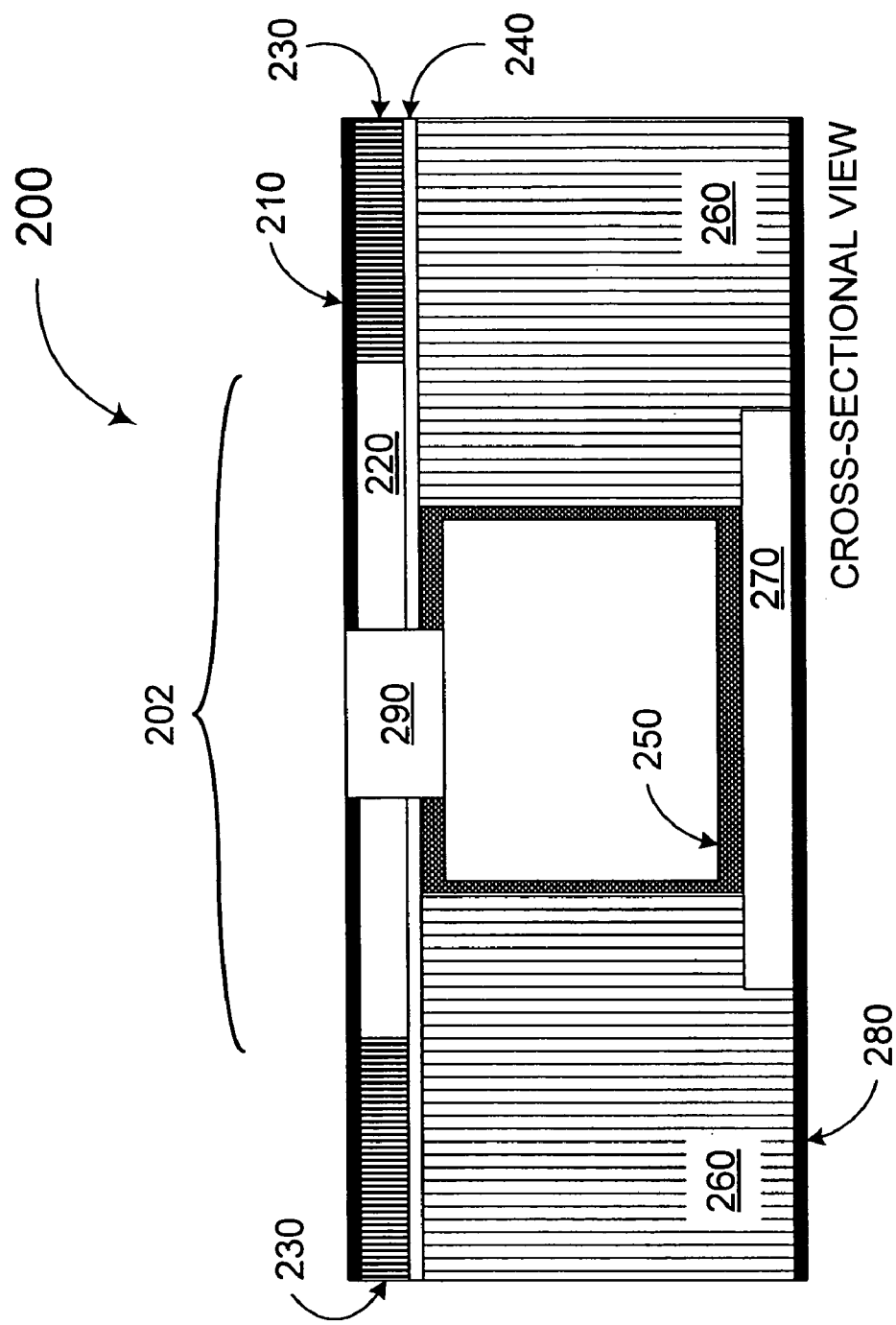
FIG. 2 depicts a cross-sectional view of a first exemplary composite floor with an attachment structure.

FIG. 2 depicts a cross-sectional view of a portion of a first exemplary composite floor 200. As shown in FIG. 2, first exemplary composite floor portion 200 has a top-layer skin 210 (a skin being a type of covering, or skin), a high-density core 230 disposed directly beneath the top-layer skin 210, a low-density core 260 affixed to the high-density core 230 via a septum 240 and a bottom-layer skin 280.

As the first exemplary composite floor portion 200 is centered about a seating track 110, FIG. 2 depicts an attaching structure 202 that includes a tubular attachment tube 250, an optional top strap 220 and an optional bottom strap 270. This attaching structure 202 provides a structural base for which a plurality of holes 290 can be provided, such holes being sized and situated as to allow aircraft seats or other external structures to be secured to the composite floor portion 200.

The exemplary top-layer skin 210 and bottom-layer skin 280 are composite laminate sheets composed of alternate layers of titanium foil and Carbon-Fiber Reinforced Plastic (CFRP, a material often referred to those in the art as simply "graphite"). However, in other embodiments the top-layer skin 210 and bottom-layer skin 280 can be composed of any number of materials including any number of known or later-developed multilayer laminates, titanium foils, foils made of other metals, fiberglass, Nomex, Kevlar, CFRP sheets, thermoplastic CFRP sheets or any other materials that may be found advantageous or desirable.

The low-density core 260 is a honeycomb structured material generally having a density of about two pounds per square inch to about six pounds per square inch. Similarly, the high-density core 230 is also a honeycomb structured material generally having a density of about eight pounds per square inch to about twenty pounds per square inch. While the density figures above are well suited for most commercial aircraft flooring designs, it should be appreciated that the particular densities can vary from application to application. It should also be appreciated that densities may vary as new honeycomb materials are developed. Accordingly, the terms "low-density core" and "high-density core" can be view relative to one another as opposed to simply defined as being within predefined density ranges.

As honeycomb composite materials are well known in the art, compiling a complete list of viable materials and combinations of material useable for the disclosed integrated floors known can be impractical. However, materials of interest do include a range of metal composites, such as titanium and aluminum, ceramic composites, Nomex composites, Kevlar composites and so on, with overall density being a factor of the materials used, the thickness of the materials used, the type and amount of resin used, cell size and so on. The resins used can be any known or later developed resin viable for honeycomb composites.

The attachment tube 250 is a rectangular hollow tube made of titanium. However, it should be appreciated that the composition and shape of the attachment tube 250 can vary from application to application as may be found advantageous or otherwise usable. For example, in various embodiments, an aluminum tube of greater thickness may be preferred, or a carbon-fiber matrix might be desirable.

The exemplary straps 220 and 270 are made of BMS 8-276 composite (a carbon-fiber epoxy prepreg composite having a 350 degree cure temperature made by Toray, Inc). However, the particular materials used can vary to include any number of materials, such as titanium or other metals, CFRP, a titanium-CFRP laminate, a variety of other laminates and so on as may be found advantageous or otherwise desirable.

The exemplary septum 240 is a structural layer, such as a CFRP layer, sandwiched between two adhesive materials. However, in various embodiments, the core material of the septum 240 can vary to include any number of materials, such as titanium or other metals, CFRP, a titanium-CFRP laminate, a variety of other laminates and so on as may be found advantageous or otherwise desirable.

Figure 3:
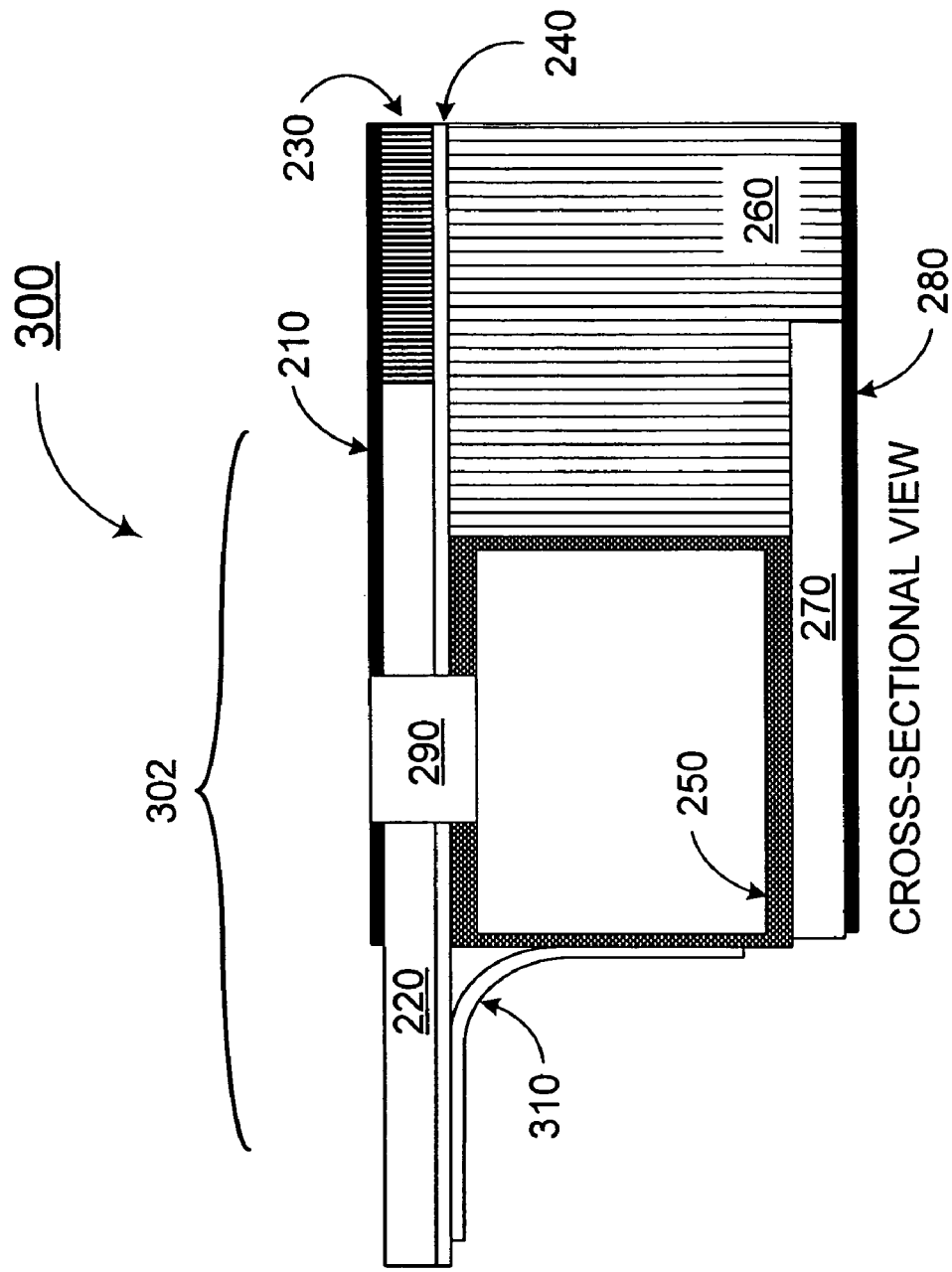
FIG. 3 depicts a cross-sectional view of the first exemplary composite floor with an edge attachment structure.

FIG. 3 is a composite flooring edge portion 300 akin to the portion 200 of FIG. 2. As shown in FIG. 3, the composite flooring edge portion 300 has a top-layer skin 210, a high-density core 230 disposed directly beneath the top-layer skin 210, a low-density core 260 affixed to the high-density core 230 via septum 240 and a bottom-layer skin 280. However, as the exemplary composite flooring edge portion 300 is both located at an edge of a floor and yet centered about an edge seating track 110, there are substantial differences with regard to the attachment structure 302. For example, as shown in FIG. 3, there is no low-density hollow core material or lower strap portion to the left of the attachment tube 250. Instead, a closeout angle device 310 is placed to the left of attachment tube 250 to provide structural reinforcement between the attachment tube 250 and the upper strap 220. As with the upper strap 220 and the lower-strap 270, the closeout angle device 310 can be made of the Toray BMS 8-276 composite mentioned above as well as any number of other materials suitable to the particular application and circumstances.

Figure 4:
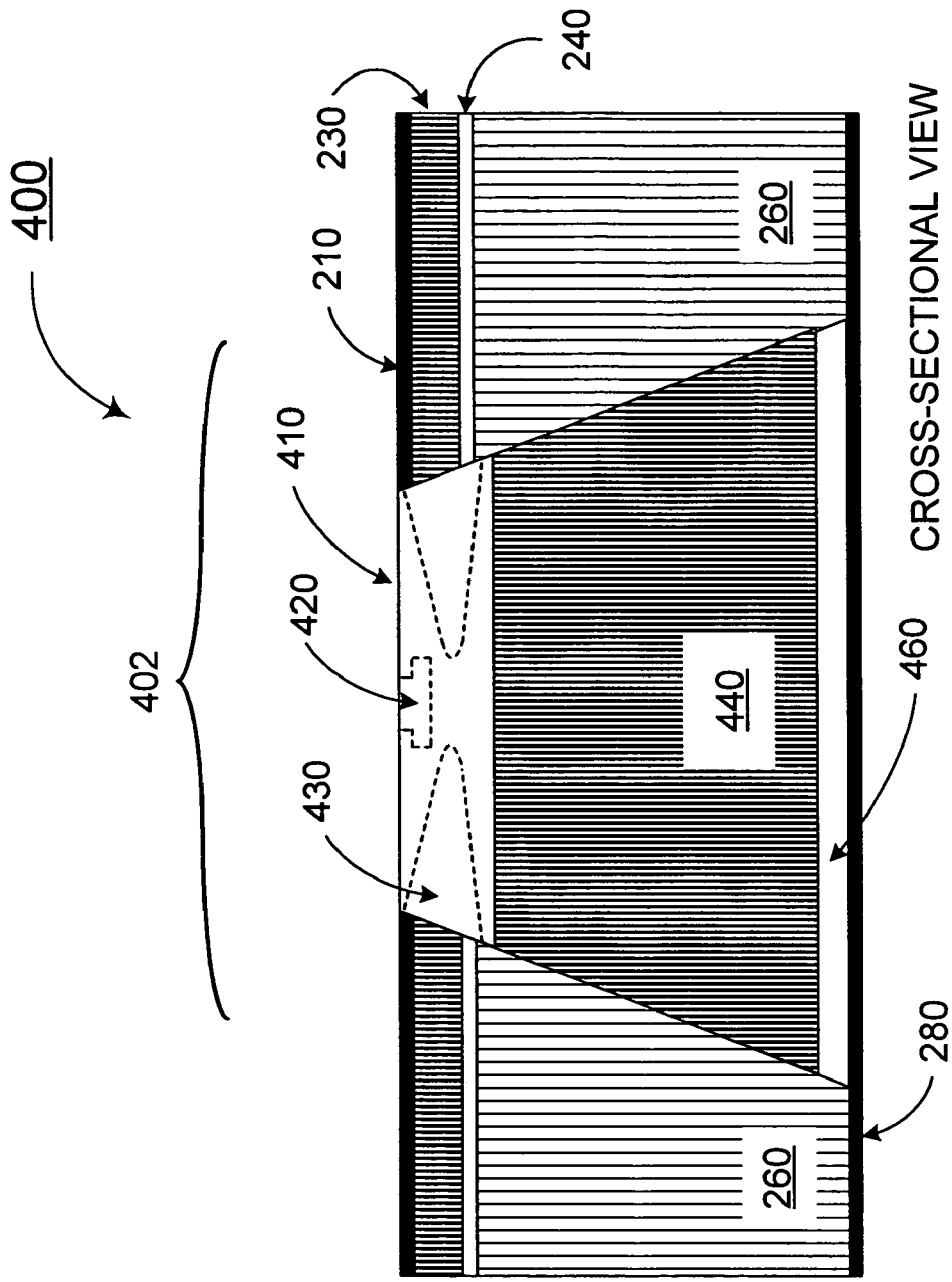
FIG. 4 depicts a cross-sectional view of a second exemplary composite floor with a second type of attachment structure.

FIG. 4 depicts a portion of a second exemplary composite floor 400 similar to the first floor of FIGS. 2–3 but having a different attachment device for attaching seats and other objects. As shown in FIG. 4, the attaching structure 402 has a generally trapezoid-like structure and includes an upper attachment strip 410, a high-density core 440 disposed below the attachment strip 410 and a lower strap 460 disposed below the a high-density core 440.

The attachment strip 410 is composed of titanium (or other metal) and has an inset structure 420 milled within in order to secure seats and other objects, and also has two milled side-portions 430 to reduce the overall weight of the attachment strip 410. The milled side-portions 430 can be filled with any number of lightweight materials or be left hollow.

The high-density core 440 of the present example is a titanium honeycomb core, but as with the other honeycomb cores 230 and 260 can vary in composition, density and structure as may be found advantageous.

The lower strap 460 of the present example is a titanium-CFRP laminate material, but in other embodiments can vary to include any variety of laminate materials, such as a Toray BMS 8-276 composite, blocks of metal or CFRP and so on.

Figure 5:
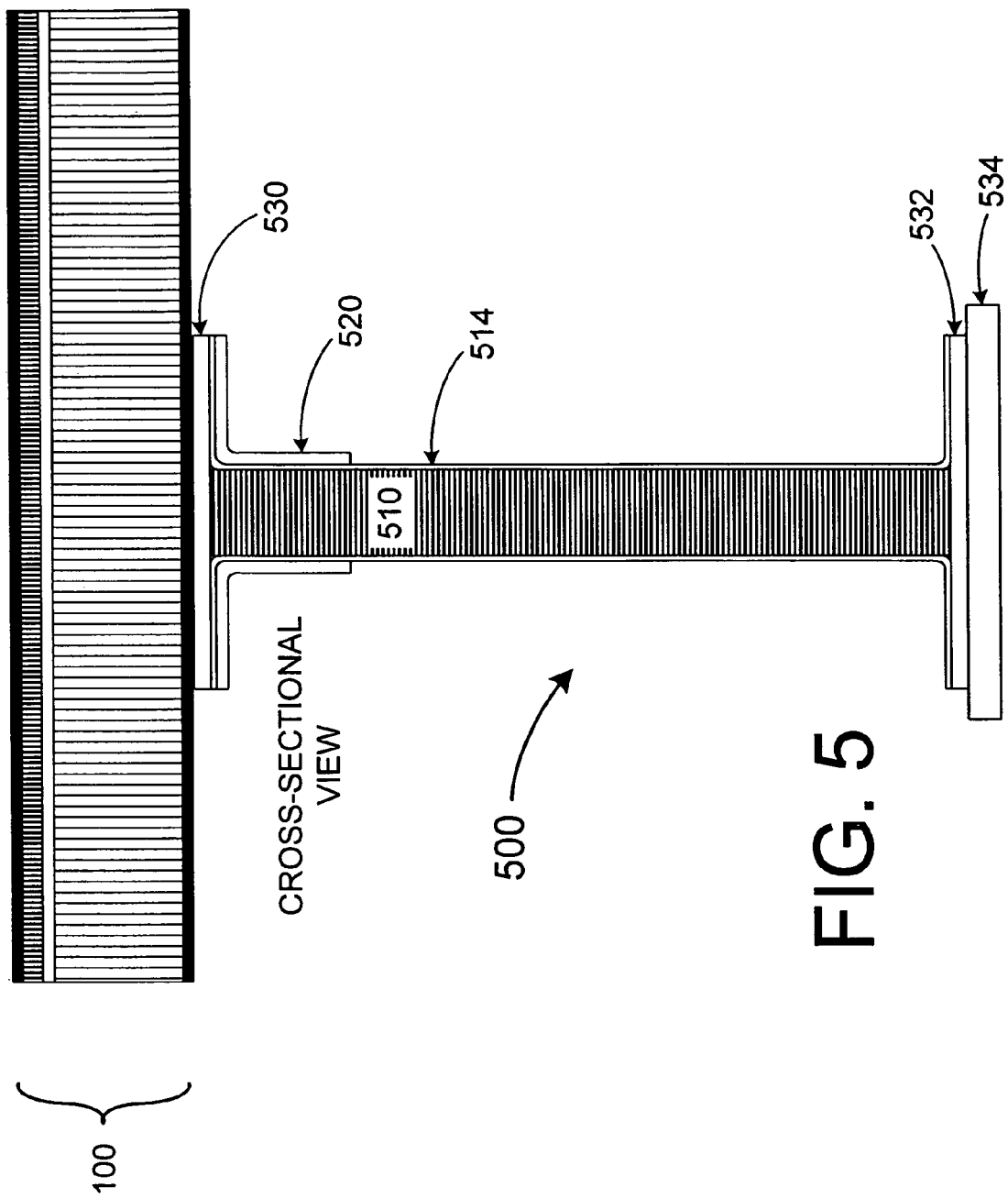
FIG. 5 depicts a cross-sectional view of a first exemplary composite floor beam.

FIG. 5 depicts a cross-sectional view of an exemplary composite floor beam 500 in relation to a composite floor 200. As shown in FIG. 5, the composite floor beam 500 has a central core 510, an upper cap 530 a lower cap 532, a left and right web 514 laminated thereon, a lower reinforcing cap 534, and a left and right doubler 520 positioned at the top of the beam 500 to add structural support.

For the present embodiment, the core 510 is a high-density honeycomb material made principally of Kevlar or titanium, caps 530 and 532 and webs 514 are titanium and the doublers 520 are made of BMS 8-276. However, the exact composition of each element 510–532 can vary from application to application as may be necessary or otherwise desired. The lower reinforcing cap 534 can be made of CFRP, which allows for a much thicker and structurally stiffer/more supportive device than if it were made of titanium of another metal. However, in other embodiments, the lower reinforcing cap 534 can be made of CFRP, a titanium-CFRP laminate, a boron-epoxy laminate or any other suitable material.

Figure 6:
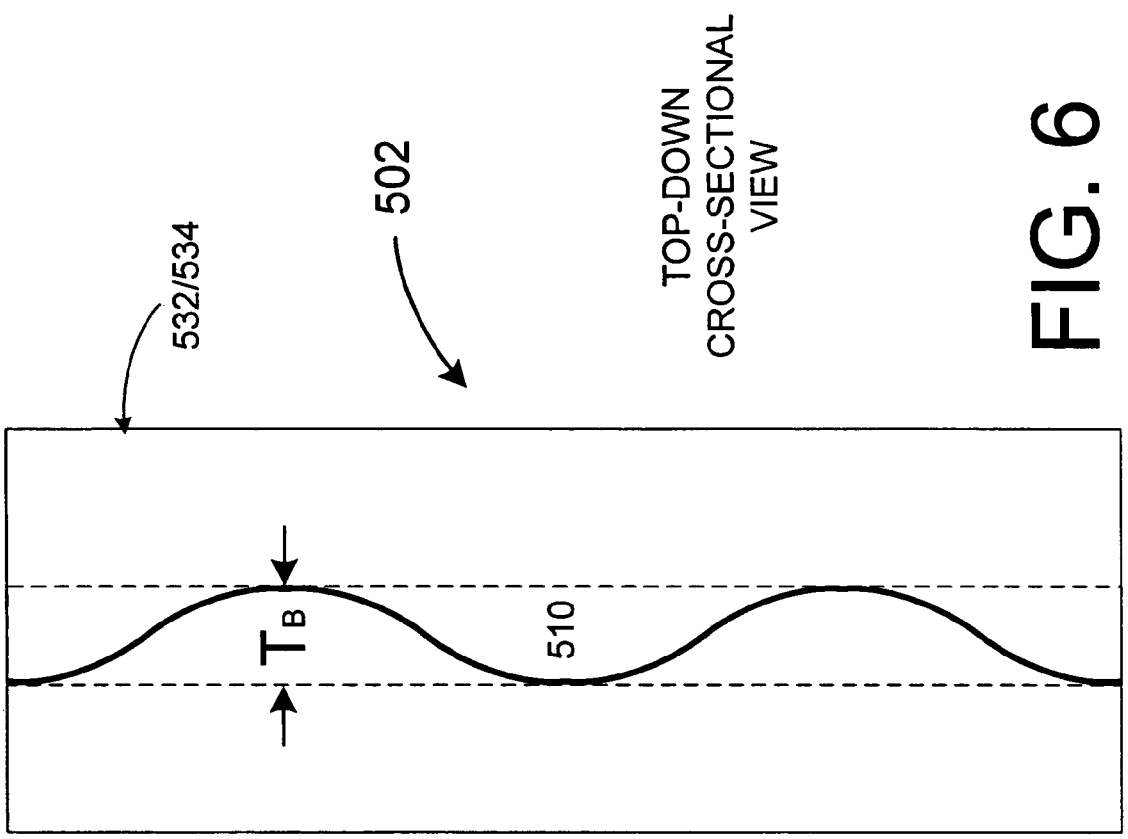
FIG. 6 depicts a top-down cross-sectional view of a particular composite floor beam embodiment.

FIG. 6 depicts a top-down cross-sectional embodiment of a particular embodiment of a metal floor beam 502. The metal floor beam 502 has a structure similar to that depicted in FIG. 5, but also depicts specific detail as to the core 510. The depicted core 510 consists of a single sheet of titanium wavering about in a sinusoidal pattern across thickness $T_B$. While FIG. 6, depicts a sinusoidal waveform, it should be appreciated that the particular waveform used may vary from application to application to encompass zigzag patterns, square-wave patterns, abutting or intermittent circles or ovals and so on with different advantages to be found in each particular form. Additionally, other metals may be substituted to create beams with different strengths and densities. While not specifically shown in FIG. 6, the core 510 makes contact with both an upper cap 530 (not shown)

and lower cap 532. These contact locations provide suitable welding positions to weld the core 510 to the upper cap 530 and lower cap 532. Such welds may run the entire length of contact or may be more localized, e.g., at spaced point along the core 510.

Figure 7:
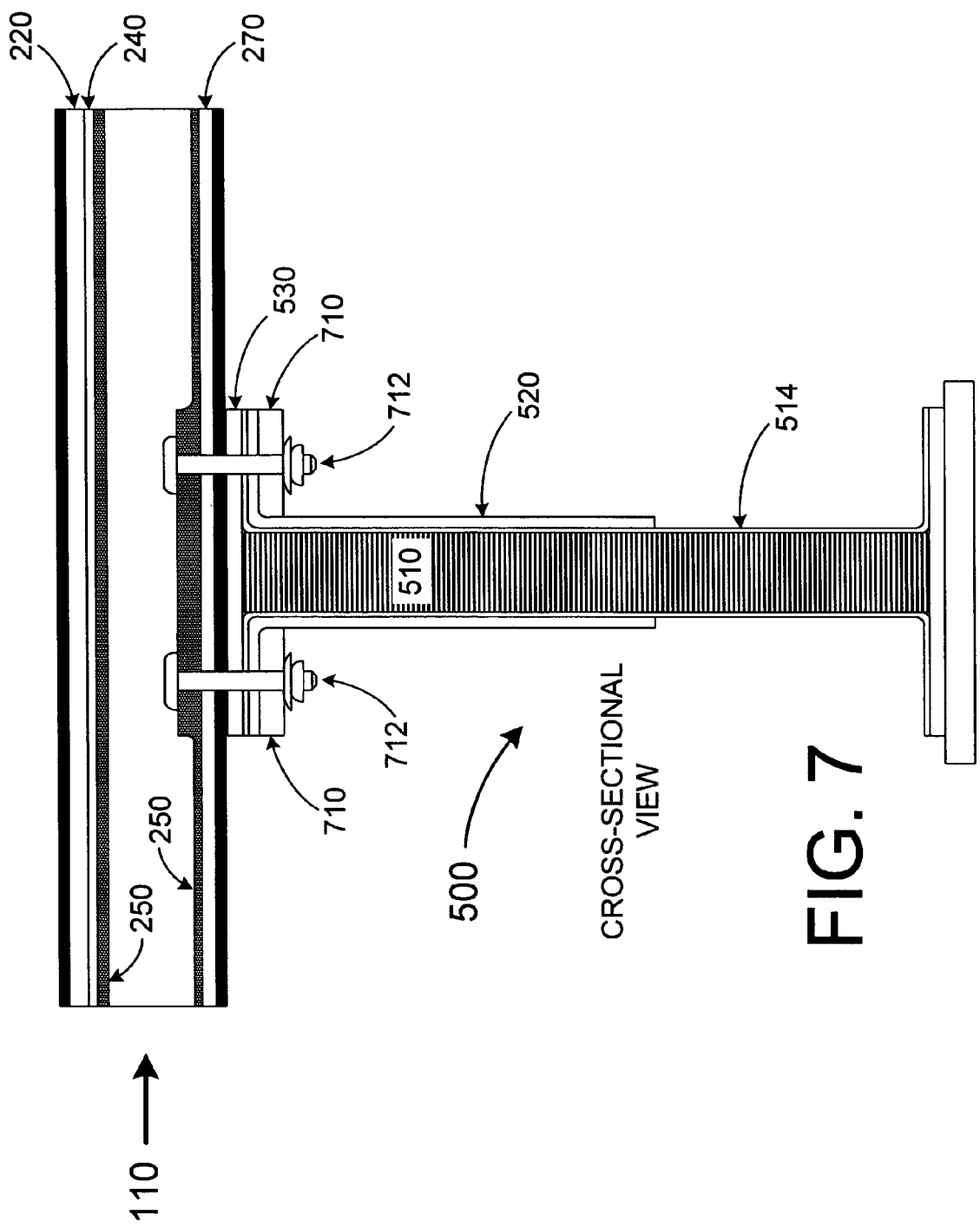
FIG. 7 depicts a cross-sectional view of an exemplary composite floor beam at a beam/member intersection.

FIG. 7 depicts a cross-sectional view of an exemplary composite floor beam 500 in relation to a composite floor 200 at an intersection node, i.e., where a seating track 110 crosses a floor beam. As shown in FIG. 7, the floor 200 and beam 500 are similar to that depicted in FIG. 5, but several differences are apparent. For example, the floor 200, while similar to that shown in FIG. 2, is viewed at a 90-degree angle relative to the perspective of FIG. 2 and shows the inside of attachment tube 250. Notably, the attachment tube 250 has a thickened portion directly above the beam 500. Additionally, the beam 500 has several reinforcing modifications: the first modification of note being that the doubler 520 is extended downward; the second modification being the addition of radius fillers 710 added just below the upper cap 530 and web 514, and the third modification being the presence of fastening devices 712, which for the present example are bolt/washer/nut combinations, but possibly rivets, screws or other viable fastening devices known in the art.

Figure 8:
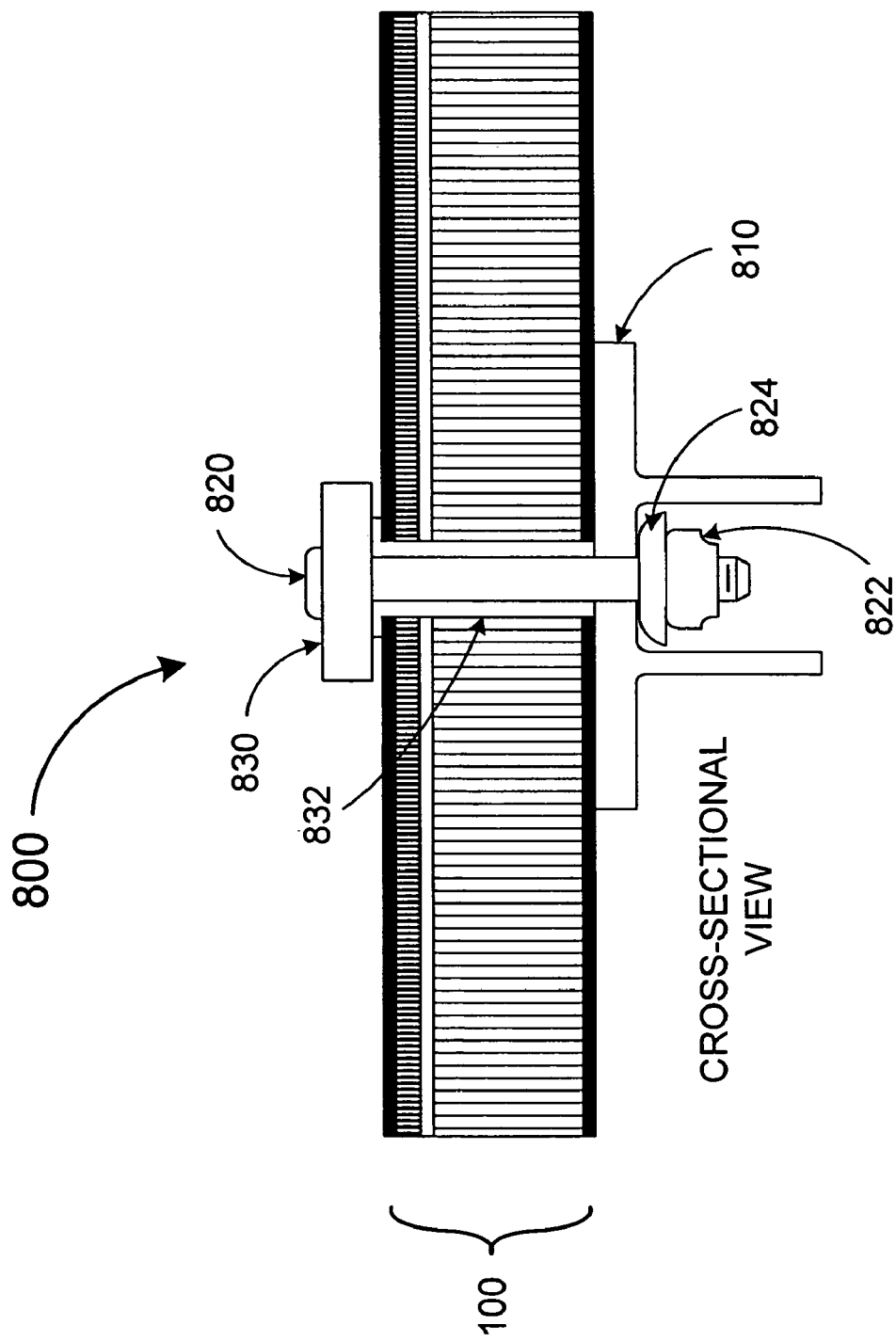
FIG. 8 an exemplary composite floor with a first securing device.

In addition to the possible requirements that an aircraft floor may need to have some means by which to secure seats or other objects, such aircraft floors themselves may need to be secured to an aircraft frame or other object. By way of example, FIG. 8 is provided to display a galley attachment 800 in combination with a composite floor 100, the galley attachment 800 being formed in a manner as to distribute a load across a sufficiently large area in order to reduce the likelihood of stress fractures or other failures. As shown in FIG. 8, the galley attachment 800 includes an upper galley mount 830 and a lower intercostals 810 secured to both one another and the composite floor 200 via a bolt 820, nut 822, washer 824 and spacer 832 combination. The intercostal 810 of the present embodiment is optionally made of BMS 8-276 and has a surface area in contact with the floor 200 wide enough to distribute any load that the floor will likely incur in a manner that will avoid unnecessary damage. Additionally, a second intercostal (or other stress-distributing device) may be added to the top of the floor 200 and beneath galley mount 830.

Figure 9:
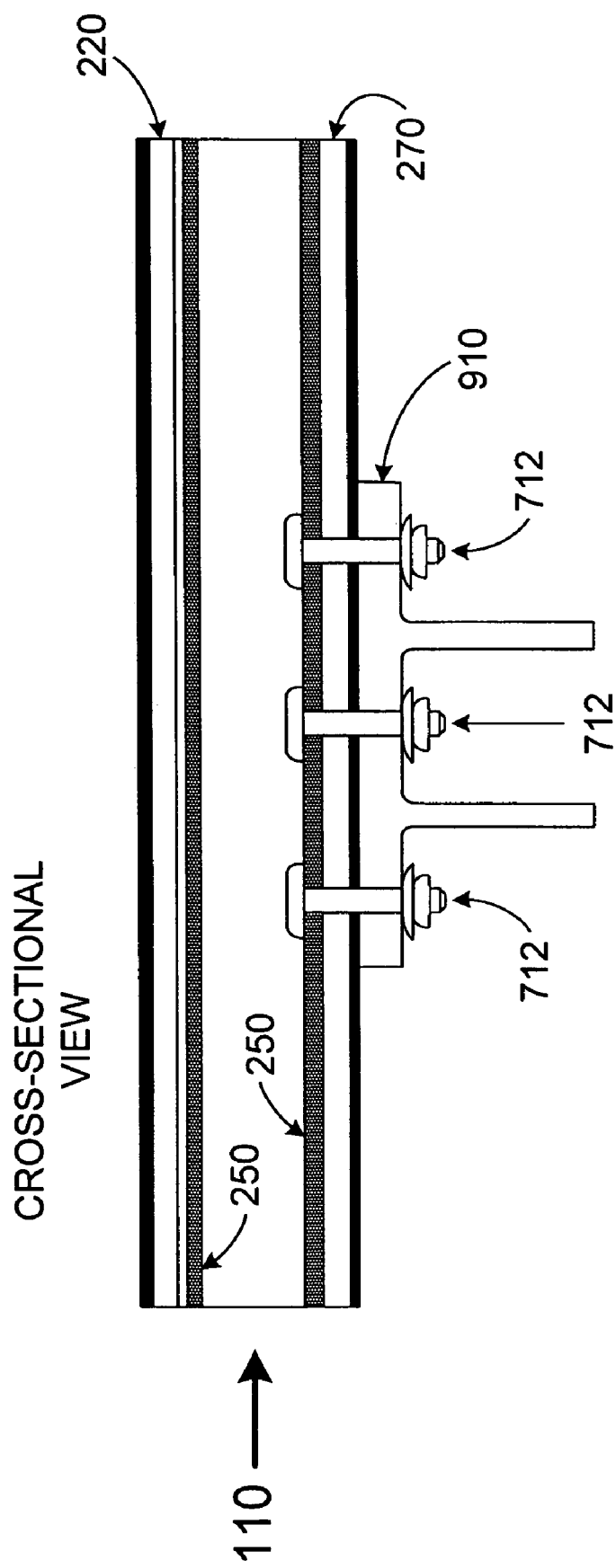
FIG. 9 an exemplary composite floor with a second securing device.

In areas where a floor may need to be reinforced, but not necessarily secured to another object, any number of other intercostals devices, such as the intercostal 910 of FIG. 9, can be provided. As shown in FIG. 9, intercostal 910 does not necessarily require a galley mount running throughout the thickness of floor 100 and may be secured to the floor 200 by means of an adhesive and/or secured in certain positions (here in the proximity of a seating track 110) via one or more fasteners 712. The intercostals 910 can greatly increase the load capacity of the floor 200 with a minimum of added weight.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An integrated floor portion made of lightweight composite materials for use in an aircraft comprising:
   a top-layer skin;
   a first structural core disposed below the top-layer skin, the first structural core being composed of a honeycomb composite material;
   a second structural core disposed below the first structural core, the second structural core being composed of a honeycomb composite material that is less dense than the first structural core;
   a bottom-layer skin disposed below the second structural core; and
   an attachment structure embedded within and running along a length of the floor portion to at least partially attach at least one seat to the floor portion.

2. The integrated floor portion of claim 1, wherein the second structural core has a density of less than six pounds per cubic foot.

3. The integrated floor portion of claim 2, wherein the second structural core is composed of at least one of Nomex and Kevlar.

4. The integrated floor portion of claim 1, wherein the attachment structure includes a hollow tube in place of at least a partial segment of the second structural core running along the length of the floor portion.

5. The integrated floor portion of claim 4, wherein the hollow tube has a substantially rectangular cross section.

6. The integrated floor portion of claim 4, wherein the attachment structure further comprises a first strap in place of at least a partial segment of the first structural core running along the length of the integrated floor portion, the first strap being located above the hollow tube and below the top-layer skin and having a width greater than that of the hollow tube.

7. The integrated floor portion of claim 6, wherein the attachment structure further comprises a second strap in place of at least a partial segment of the second structural core running along the length of the integrated floor portion, the second strap being located below the hollow tube and above the bottom-layer skin.

8. The integrated floor portion of claim 1, wherein the attachment structure includes a metal strip in place of at least a partial segment of the first structural core running along the length of the integrated floor portion, the metal strip having an integral securing structure formed within, an upper surface of the securing structure being substantially flush with an upper surface of the top-layer skin and having an opening to receive at least one seat.

9. The integrated floor portion of claim 8, wherein the attachment structure further includes a third structural core disposed below the metal strip in place of at least a partial segment of the second structural core running along the length of the integrated floor portion, the third structural core being composed of a honeycomb composite material and being more dense than the second structural core.

10. The integrated floor portion of claim 1, wherein the first structural core has a density greater than about eight pounds per square inch.

11. The integrated floor portion of claim 1, wherein the first structural core is composed of any one or more of Nomex, Kevlar and a metal.

12. The integrated floor portion of claim 1, wherein the top-layer skin is composed of at least one of a titanium foil sheet, a titanium-CFRP laminate, a fiberglass laminate, a carbon-fiber reinforced plastic sheet and a thermoplastic sheet.

13. The integrated floor portion of claim 1, further comprising a composite floor beam disposed below the bottom-layer skin and running along a width of the integrated floor portion.

14. The integrated floor portion of claim 13, wherein the composite floor beam includes a substantially flat, thin portion having a plane perpendicular to the plane of the bottom-layer skin.

15. The integrated floor portion of claim 14, wherein the composite floor beam includes a honeycomb core and a web covering the honeycomb core.

16. The integrated floor portion of claim 15, further comprising reinforcement means located at an intersection node of the floor beam and the attachment structure.

17. The integrated floor portion of claim 1, further comprising at least one intercostal for securing the integrated floor portion to another object.

18. The integrated floor portion of claim 1, wherein the attachment structure effectively replaces a longitudinal segment of the first and second structural cores.

19. The integrated floor portion of claim 1, wherein the floor portion is centered about the attachment structure.

20. The integrated floor portion of claim 1, wherein the first structural core is attached to the second structural core by way of a septum.

21. The integrated floor portion of claim 4, wherein the hollow tube is composed of an alloy of titanium.

22. The integrated floor portion of claim 9, wherein the attachment structure further comprises a lower strap in place of at least a partial segment of the second structural core running along the length of the integrated floor portion, the lower strap being located below the third structural core and above the bottom-layer skin.

23. The integrated floor portion of claim 9, wherein the metal strip, the third structural core and the lower strap have a generally trapezoidal cross section.

24. An integrated floor portion for use in an aircraft, comprising:
a top-layer skin;
a high density honeycomb core disposed below the top-layer skin;
a low-density honeycomb core disposed below and secured to the high-density honeycomb core;
a bottom-layer skin disposed below the low-density honeycomb core;
a hole through the integrated floor portion substantially perpendicular to an upper surface of the floor;
an upper galley mount disposed above the top-layer skin surrounding the hole;
an intercostal disposed below the bottom-layer skin surrounding the hole; and
a fastener to tie the upper galley mount to the intercostal.

25. The integrated floor portion of claim 24, further comprising a composite beam disposed below the bottom-layer skin.

26. An integrated floor portion for use in an aircraft, comprising:
a top-layer skin;
first honeycomb composite structural means disposed below the top-layer skin and secured to the top-layer skin for providing structural support;
second honeycomb composite structural means disposed below the first structural means and secured to the first structural means;
a bottom-layer skin disposed below the second structural means and secured to the second structural means;
attachment means embedded within and running along a length of the floor portion for attaching at least one seat to the integrated floor portion.

27. The integrated floor portion of claim 26, further comprising one or more attaching means disposed against the first structural means for attaching or reinforcing the integrated floor portion.

* * * * *

UNITED STATES PATENT AND TRADEMARK OFFICE
CERTIFICATE OF CORRECTION

| | | |
|---|---|---|
| PATENT NO. | : 7,182,291 B2 | Page 1 of 1 |
| APPLICATION NO. | : 11/086307 | |
| DATED | : February 27, 2007 | |
| INVENTOR(S) | : Willard N. Westre et al. | |

It is certified that error appears in the above-identified patent and that said Letters Patent is hereby corrected as shown below:

On the title page:

<u>Item (56), Foreign Patent Documents</u>

Please replace "FR 2 686 0431 A1" with --FR 2 686 043 A1--.

Signed and Sealed this

Eighth Day of May, 2007

JON W. DUDAS
*Director of the United States Patent and Trademark Office*